US006739164B2

(12) United States Patent
Warmack

(10) Patent No.: US 6,739,164 B2
(45) **Date of Patent: *May 25, 2004**

(54) REMOTE CONTROL LOCK DEVICE

(76) Inventor: Todd Warmack, P.O. Box 12788, Tallahassee, FL (US) 32317

(*) Notice: Subject to any disclaimer, the term of this patent is extended or adjusted under 35 U.S.C. 154(b) by 0 days.

This patent is subject to a terminal disclaimer.

(21) Appl. No.: 10/299,185

(22) Filed: Nov. 19, 2002

(65) Prior Publication Data

US 2003/0121301 A1 Jul. 3, 2003

Related U.S. Application Data

(63) Continuation of application No. 09/725,668, filed on Nov. 29, 2000, now abandoned, which is a continuation-in-part of application No. 09/182,066, filed on Oct. 27, 1998, now Pat. No. 6,244,084, which is a continuation-in-part of application No. 09/032,074, filed on Feb. 27, 1998, now abandoned.

(51) Int. Cl.[7] .............................................. B60R 25/04

(52) U.S. Cl. .......................... 70/257; 70/278.1; 70/279; 292/144

(58) Field of Search .......................... 70/256, 257, 224, 70/277–283.1; 292/201, 216, 144

(56) References Cited

U.S. PATENT DOCUMENTS

| | | | | |
|---|---|---|---|---|
| 5,531,086 A | | 7/1996 | Bryant | 70/279 |
| 5,790,034 A | * | 8/1998 | Khoury | 70/256 X |
| 5,791,179 A | * | 8/1998 | Brask | 70/278 |
| 5,862,693 A | * | 1/1999 | Myers et al. | 70/278 |
| 6,244,084 B1 | * | 6/2001 | Warmack | 70/278.1 |
| 6,381,999 B1 | * | 5/2002 | Doong | 70/277 X |
| 6,517,127 B1 | * | 2/2003 | Lu et al. | 292/144 |
| 6,546,769 B2 | * | 4/2003 | Miller et al. | 70/278.1 X |

* cited by examiner

*Primary Examiner*—Suzanne Dino Barrett
(74) *Attorney, Agent, or Firm*—Lawrence L. Carnes; J. Ronald Richebourg

(57) ABSTRACT

A remote control locking system for use in combination with a deadbolt lock and a doorknob lock mechanism in a conventional door locking device. The locking system includes a first gear assembly coupled to the deadbolt lock mechanism; and, a second gear assembly coupled to the doorknob lock mechanism. A receiver is coupled to a control unit, which is disposed for controlling the first gear assembly and the second gear assembly for enabling the lock mechanisms to lock or unlock. A remote control device including a transmitter is used for sending a signal to the receiver for activating the locking system. The locking system also includes a first motor disposed for driving the first gear assembly and operative in response to a first signal from the receiver; and, a second motor disposed for driving the second gear assembly and operative in response to a second signal from the receiver.

15 Claims, 11 Drawing Sheets

Fig. 11
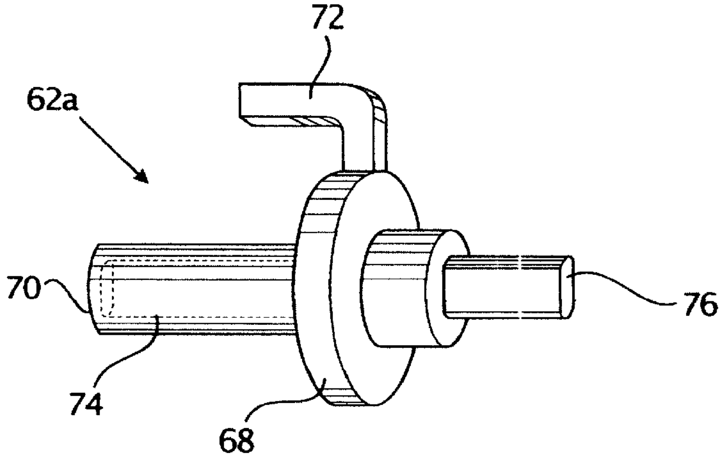
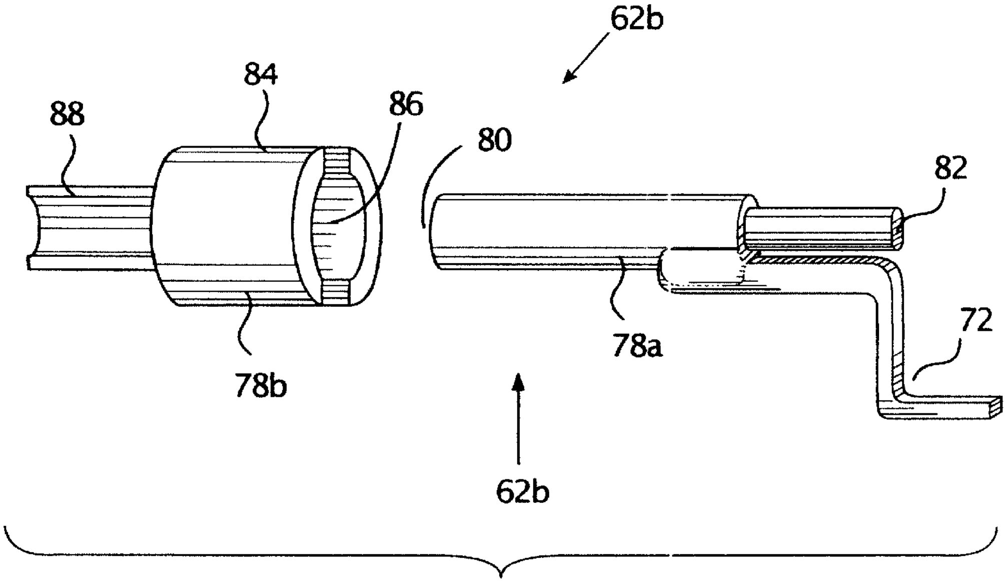
Fig. 12

REMOTE CONTROL LOCK DEVICE

This is a Continuation of application Ser. No. 09/725,668 filed Nov. 29, 2000, now abandoned. Which is a continuation-in-part of Ser. No. 09/182,066 filed on Oct. 27, 1998 now U.S. Pat. No. 6,244,084 which is a continuation-in-part of Ser. No. 09/032,074 filed on Feb. 27, 1998 now abandoned.

BACKGROUND OF THE INVENTION

1. Field of the Invention

The present invention relates generally to a remote control lock device and more particularly to a remote control lock device that can quickly and efficiently lock or unlock either a key lock, dead bolt, or a combination thereof (typically associated with lock devices located in homes, offices and other applications) by utilizing a hand held remote control transmitter. The unit is designed so as to be compatible with conventional locks on the market and one which will utilize a gear system for adequately engaging and disengaging the locking unit of a conventional door, while still providing for a compact, non-obtrusive and aesthetically pleasing product.

2. Description of the Prior Art

Over the years, incidents relating to home burglaries and theft have steadily increased. This increase has concerned the consumer and these concerns have lead them to invest in more elaborate home safety devices, including the use of dead bolts, burglar alarms, a combination thereof, or the like. Though these devices are known to work successfully, they may not offer the protection needed for some consumers. For example, some consumers do not have their keys ready for insertion into the lock and many find themselves searching through their belongings in hopes of finding their keys quickly. Such a pause in opening the door is a perfect invitation to a thief, robber or the like for jumping, attacking, harming or robbing the individual.

In other situations, some may have their hands full of groceries, a child, or the like. This causes their hands to be occupied and unavailable to quickly and efficiently unlock the door. A typical, yet potentially dangerous, scenario.

As such, devices have been developed to assist the consumer and to inherently decrease the time needed to enter a home. One such device is a keyless entry dead bolt lock disclosed in U.S. Pat. No. 5,531,086 issued to Bryant. In this patent, the dead bolt locking system includes an actuator, which is coupled to a conventional dead bolt mechanism via a connection rod. The actuator is controlled by way of a motor. The motor is electrically and mechanically connected to a receiver. In operation, a signal from a transmitter is sent to the receiver. The receiver activates the actuator, which pulls the connecting rod. The pulling of the connecting rod will inherently cause the dead bolt to rotate. Though this design will allow for the dead bolt to operate from a remote control unit, it suffers some shortcomings. One such shortcoming is that this prior art configuration requires the device to extend horizontally across the door. The horizontal displacement can be obtrusive and bulky, thereby producing a product, which is not aesthetically pleasing, something undesirable by many consumers. In addition, the design and configuration of the connecting rod to the conventional dead bolt and actuator is such that after extended use, it may dislodge therefrom. The dislodgment will defeat its intended purpose. Further still, this system is solely utilized for dead bolts and does not address other locking systems typically used in a home, office or the like.

Accordingly, a need exists for a system that can be installed or retrofitted easily and quickly to any existing door lock system, typically associated with homes, offices, or the like. Such a device should produce successful results without being obtrusive and bulky when installed.

As shown, none of these previous efforts provide the benefits intended with the present invention as identified by the needs set forth hereinabove. Additionally, prior art techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a remote control lock device that is designed and configured to be used on any type of rotating lock typically associated with residential homes, offices, or the like. This device is a singular unit that is utilized with a combined dead bolt mechanism and key operated lock, generally those associated with residential homes, businesses or the like. In use, the system is a unit that can easily be attached to an existing door so as to provide for a kit that can be retrofitted and coupled to an existing dead bolt lock, a key operated lock, or a combination thereof, so as to provide for an aesthetically pleasing, as well as efficient system.

The unit is specifically designed with an adjusting mechanism so as to enable the product to be acceptable to all types and styles of locks, regardless of the distance between the deadbolt and turnkey. This will provide for the particular unit to be structured so as to be compact in size and dimension and to provide for a final product that is effective, successful, and non-obtrusive.

The present invention is a singular unit that is designed and configured to be coupled to a deadbolt and a doorknob lock mechanism. When coupled to the door knob lock mechanism, the present invention will control the locking mechanism and not the door knob itself, so as to provide for the knob to rotate freely and not prevent normal use of the knob.

In use, each lock, the dead bolt and doorknob lock mechanism will be coupled to a gear assembly. This will provide for a separate gear assembly coupled to the dead bolt and a separate gear assembly coupled to the door knob lock. Each gear assembly is controlled via a conventional motor. A linking finger couples the gear assembly to its respective lock. This linking finger provides for the rotation of the particular conventional existing lock mechanism. Thus, the linking finger will provide for the rotation of the locking mechanism of the dead bolt and the doorknob.

To activate the unit a remote control is used. When it is desired to unlock or lock the conventional locks, the remote control unlock triggering mechanism is activated. During the unlocking/locking activation, the motor of each respective assembly is rotated in a desired direction. This will cause the respective gear assemblies to rotate, inherently causing the linking finger of each assembly to rotate and cause the conventional lock to turn, and subsequently unlock. Inherently, the second gear rotates and causes the rotation to reach the third or control gear. Rotation of the control gear will provide for the member located within the channel to revolve, consequently causing the finger, and ultimately the lock mechanism to turn.

For ceasing rotation of each assembly, conventional cams are secured to each gear assembly. Once the cam communicates with a micro-switch, the system of the present invention will be aware that the lock is in either a locked or unlocked position, and thus terminate the rotation process by disabling the motor.

The present invention is remote control locking system for use in combination with a first and a second lock mechanism in a conventional door locking device. The locking system includes a first gear assembly coupled to the first lock mechanism; and, a second gear assembly coupled to the second lock mechanism. A receiver is coupled to a control unit, which is disposed for controlling the first gear assembly and the second gear assembly for enabling the lock mechanisms to lock or unlock. A remote control device including a transmitter is used for sending a signal to the receiver for activating the locking system. The locking system also includes a first motor disposed for driving the first gear assembly and operative in response to a first signal from the receiver; and, a second motor disposed for driving the second gear assembly and operative in response to a second signal from the receiver.

Accordingly, it is an object of the present invention to provide for a remote control lock device that will overcome the deficiencies, shortcomings, and drawbacks of prior lock devices, remote control lock devices and methods thereof.

Still another object of the present invention is to provide for a remote control lock device that is easy to use, successful in operation, non-obtrusive and aesthetically pleasing.

Another object of the present invention is to provide for a remote control lock device that locks and unlocks any style or type of rotating lock and which will also operate independently from the remote control device.

A further object of the present invention is to provide a remote control lock device that can be retrofitted and installed to existing and conventional locks, typically associated with residential homes, offices, or the like, and without marking or marring the existing door.

Still a further object of the present invention, to be specifically enumerated herein, is to provide a remote control lock device in accordance with the preceding objects and one that will conform to conventional forms of manufacture, be of simple construction and easy to use so as to provide for a device that would be economically feasible, long lasting and relatively trouble free in operation.

Although there have been some inventions related to a remote control lock device, none of the inventions utilize a rotating means nor do the inventions address key locks, typically associated with knobs of the door. The present invention is simple in design, compact in size, economically feasible, and easy to install and maintain. Installation for retrofitting the unit to an existing lock requires a minimal amount of training to successfully complete.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

FIG. 11 is a perspective view of the adapter secured to the conventional rotating mechanism of the conventional deadbolt assembly and used with the remote control lock device of the present invention.

FIG. 12 is a perspective view of the adapter secured to the conventional rotating mechanism of the conventional doorknob assembly and used with the remote control lock device of the present invention.

Similar reference numerals refer to similar parts throughout the several views of the drawings.

DESCRIPTION OF THE PREFERRED EMBODIMENTS

Figure 1:
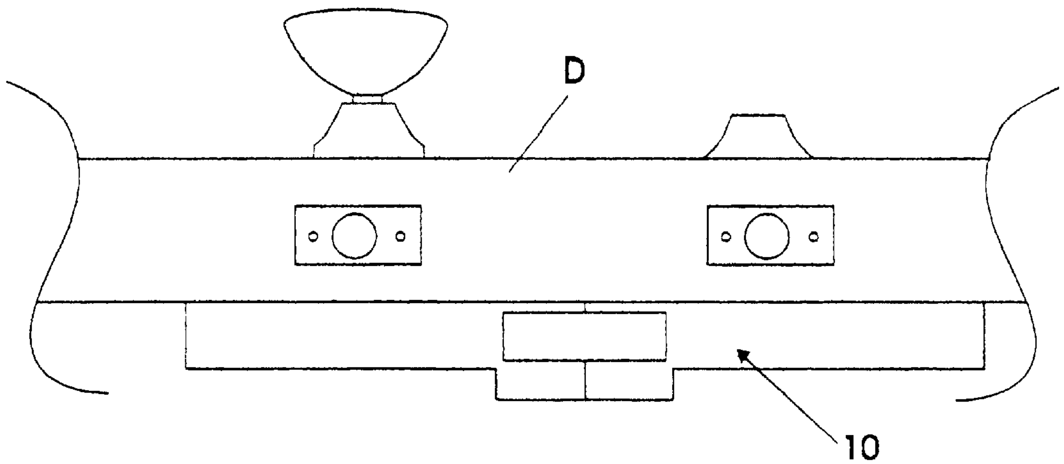
FIG. 1 is a side view of the remote control lock device attached and used with a conventional door knob and conventional dead bolt lock, with the cover attached thereto, illustrating the cavity within the cover that maintains the power source used with the present invention.
Figure 2:
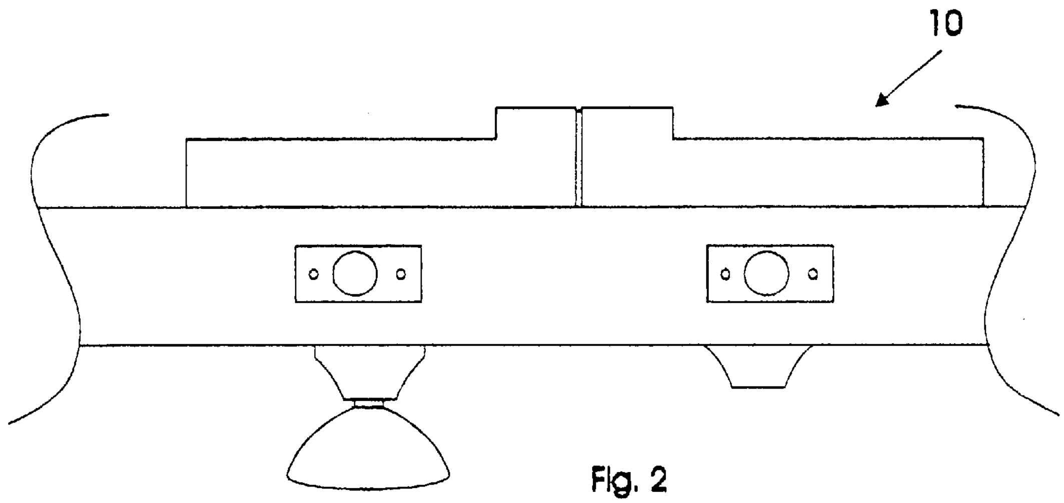
FIG. 2 is a side view of the remote control lock device attached and used with a conventional doorknob and conventional dead bolt lock.
Figure 3:
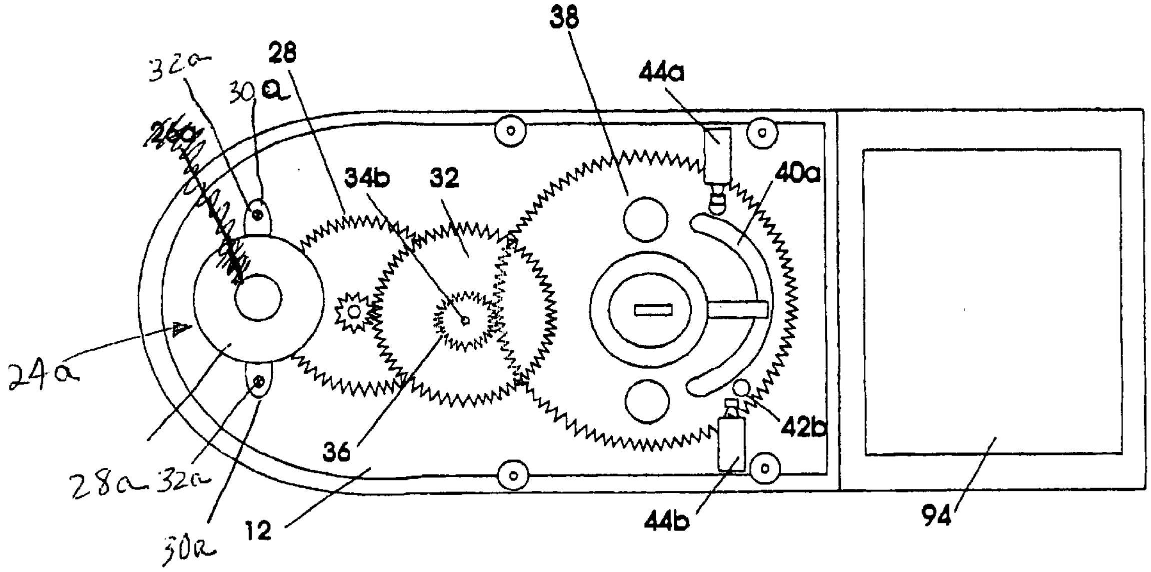
FIG. 3 is a top view of the remote control lock device, having the cover removed therefrom, illustrating the internal mechanism of the gear assembly of the present invention.
Figure 4:
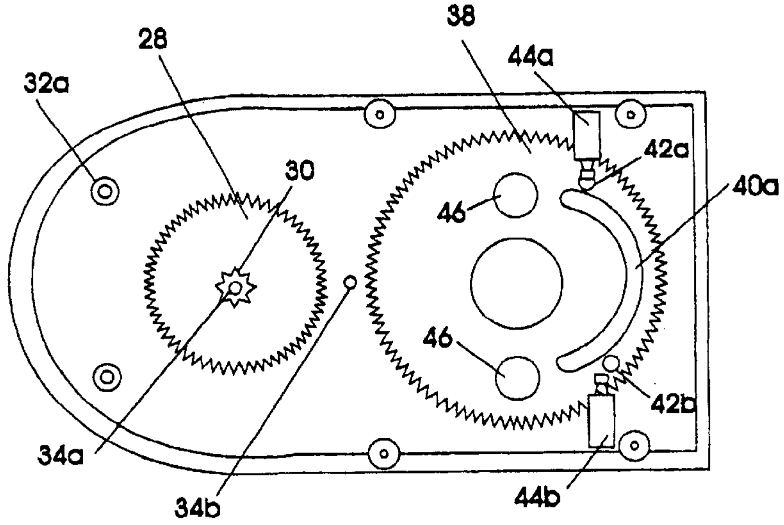
FIG. 4 is a top planar view partially illustrating the first gear assembly, used in the present invention, utilized to control the rotation of the lock assembly of a conventional deadbolt.
Figure 5:
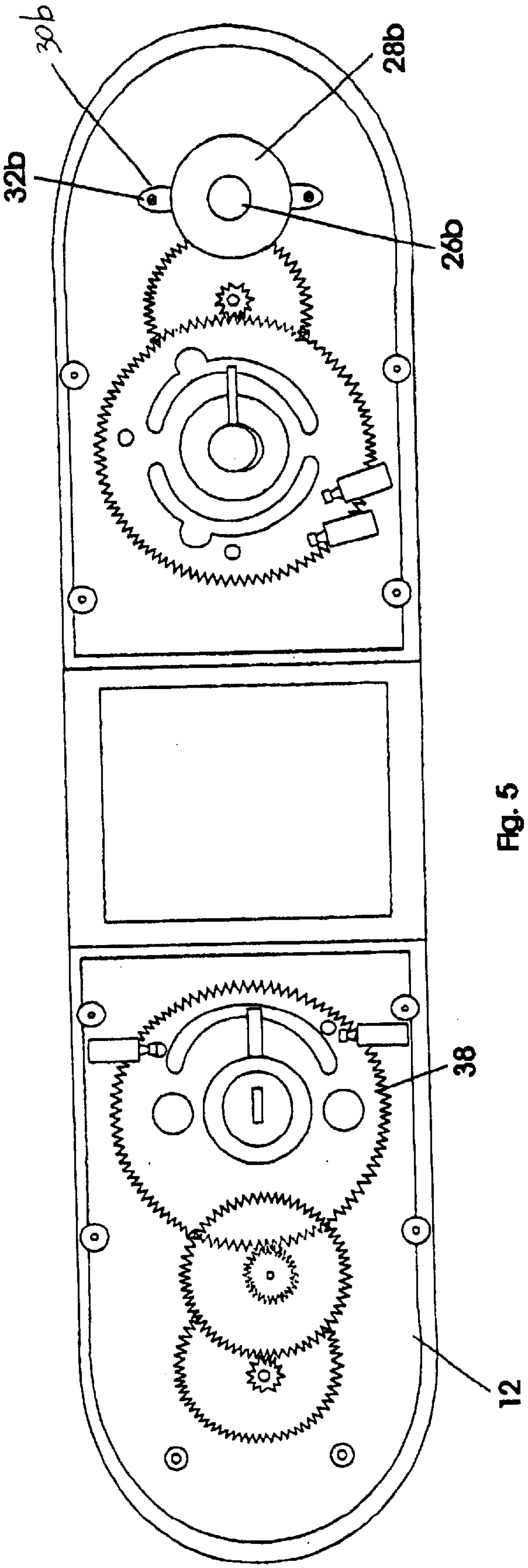
FIG. 5 is a top planar view of the first gear and second gear assembly, used in the present invention, utilized to control the rotation of the lock assembly of a conventional deadbolt.
Figure 6:
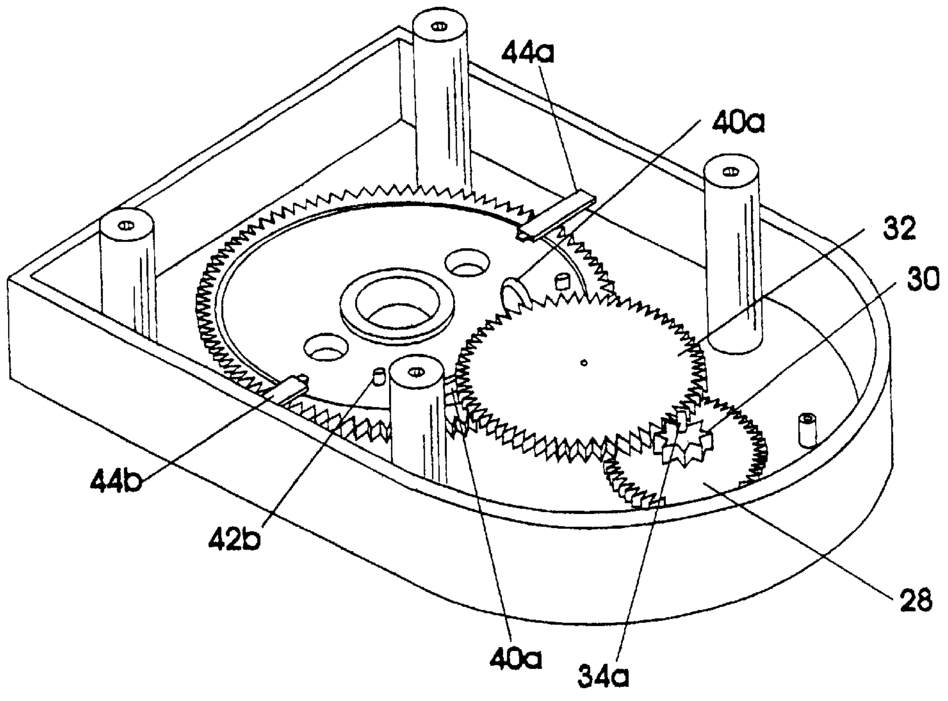
FIG. 6 is a perspective view of the first gear assembly, used in the present invention, with the motor removed, which is utilized to control the rotation of the lock assembly of a conventional deadbolt.
Figure 7:
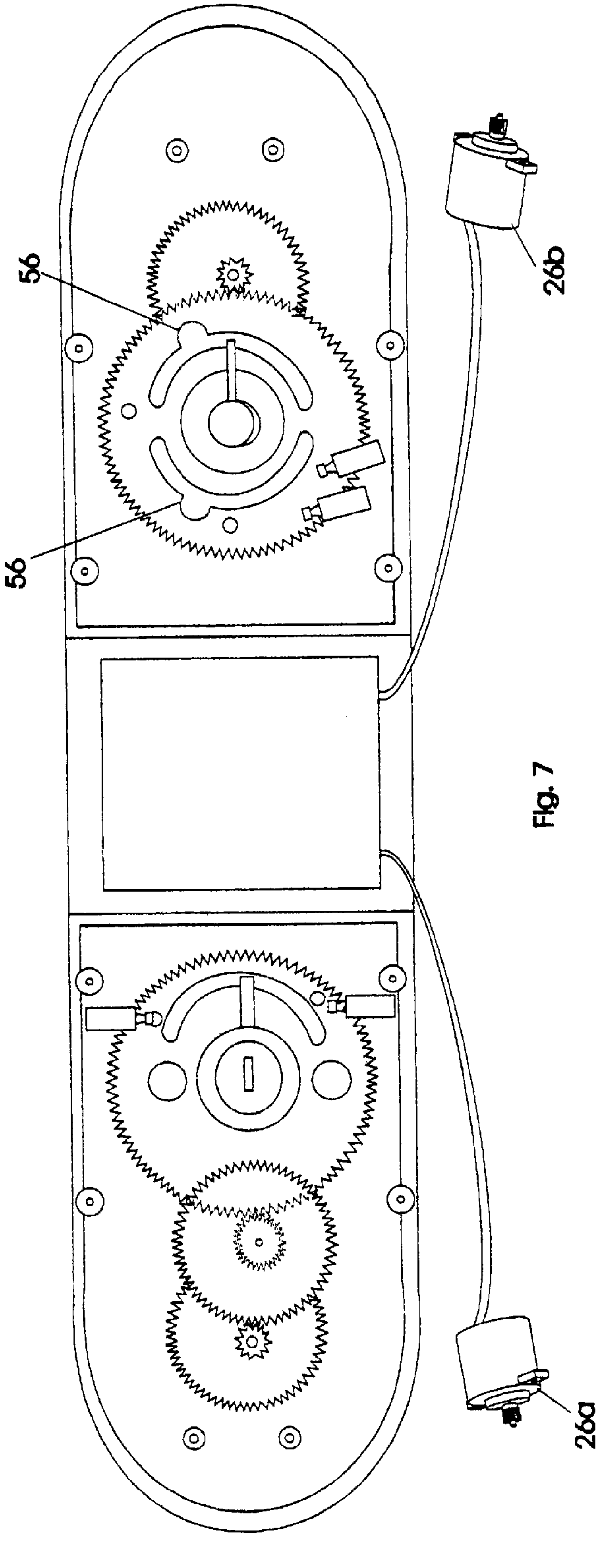
FIG. 7 is a top planar view of a partial illustration of the components used in the first gear assembly of the present invention, utilized to control the rotation of the lock assembly of a conventional deadbolt.
Figure 8:
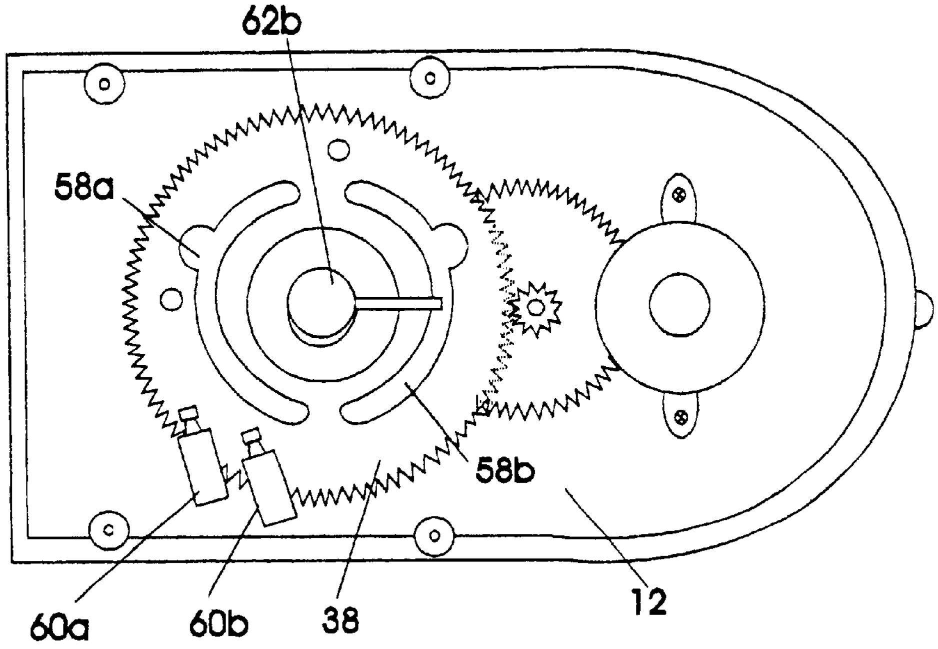
FIG. 8 is a top planar view of the second gear assembly, used in the present invention, with the motor removed, which is utilized to control the rotation of the lock assembly of a conventional doorknob.
Figure 9:
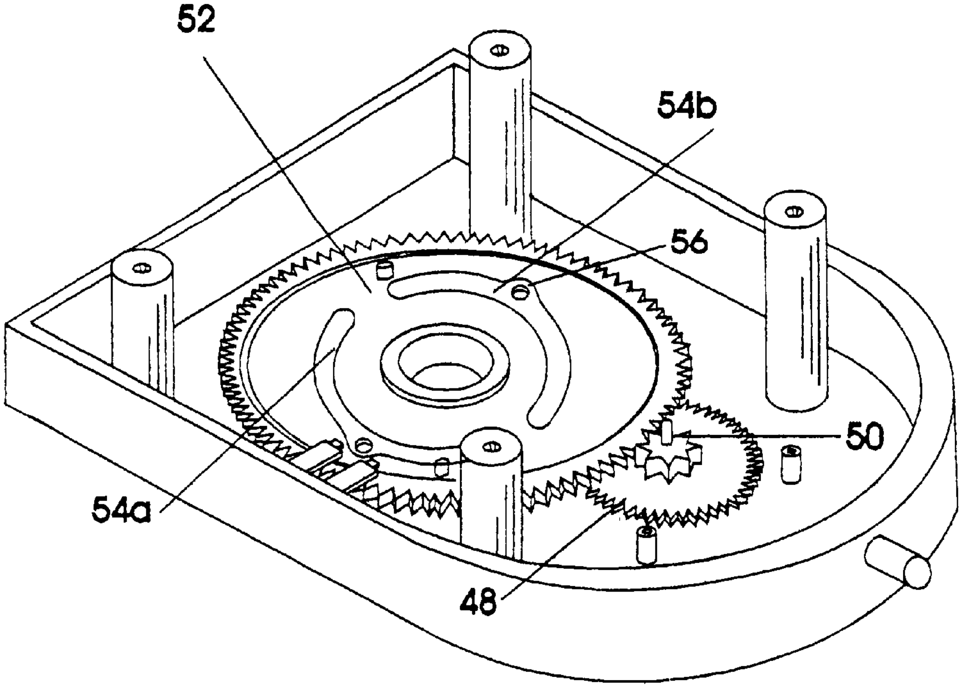
FIG. 9 is a perspective view of the second gear assembly, used in the present invention, utilized to control the rotation of the lock assembly of a conventional doorknob.
Figure 10:
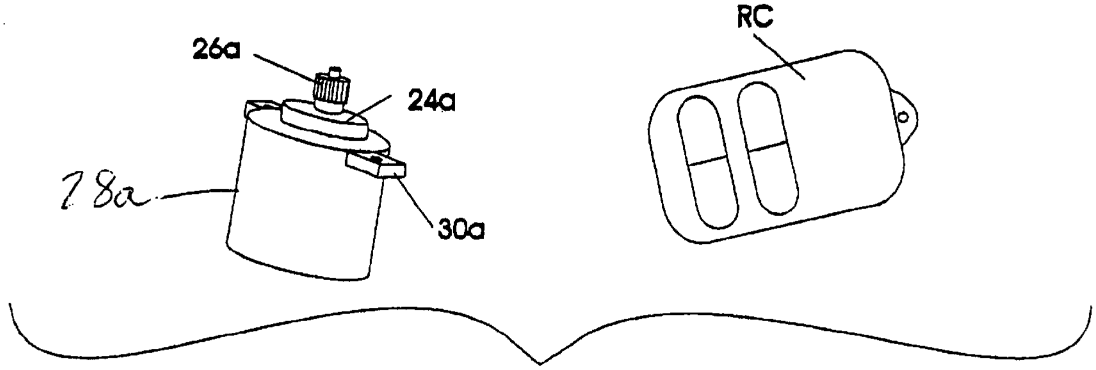
FIG. 10 is a perspective view of the motor and the remote control device used with the present invention.

The present invention is a remote control lock device designed and configured to manipulate and control a lock mechanism in a conventional deadbolt and conventional doorknob lock assembly. With reference to the drawings and in particular to FIGS. 1–16, there is shown the present invention, known as a remote control lock device, generally designated by reference numeral 10. This particular apparatus is designed to be secured to the interior area of a conventional door so as to be coupled and mechanically interact with the locking mechanism of the conventional doorknob and dead bolt. This will provide for an apparatus that will control the lock mechanism, yet still allow for free rotation of the conventional knob. Thus, providing for a lock assembly that solely controls the lock mechanism.

As seen in the figures, the present invention is a remote control lock device 10 having a modular unit 12. The modular unit houses all the components of the present invention. Located in the module unit 12 is a conventional receiver (R) that can receive signals from a conventional remote control unit (RC). Generally stated, the conventional receiver (R) receives a transmitted signal from the remote control unit RC (transmitter). Upon receiving the signal, the present invention 10 is activated and enables the locks to rotate accordingly, either in a lock position or into an unlock position.

The module unit 12 is designed to be attached and coupled to the interior surface of the existing door. This will provide for the module unit 12 to be sandwiched between the interior surface of the conventional door D and the interior hardware used with the conventional lock assemblies. Such an arrangement will also enable the conventional lock mechanism of the dead bolt and doorknob to extend partially through the present invention 10.

In order to attach the modular unit 12 to the existing locks, an upper section and a lower section are included. Secured to the rear of each section is a mounting bracket 14 (see FIG. 16). The mounting bracket 14, for the upper section is a plate having a central channel 16 and two side channels 18. The central channel 16 is alignable with the rotating shaft (mechanical rotation portion) of the deadbolt. The side channels 18 are configured so as to align with the existing holes (illustrated, but not labeled) of a conventional deadbolt lock assembly. Screws or the like are inserted into the channels 18 and then into the holes located in the conventional deadbolt lock assembly in order to secure the mounting bracket to the deadbolt assembly. The use of channels allows for the user to slide the module so as to accommodate the various lengths between the deadbolt and doorknob. In this configuration it is seen that the modular unit 12 is not attached to the door, but rather to the lock mechanism so as to avoid marring and marking the door.

Apertures extend through the upper portion of the modular unit 12. These apertures correspond to the central channel 16 and side channels 18, respectively. Hence, when attaching the unit to the conventional lock, the screws are inserted into the apertures of the modular unit 12, through the channels 16, 18 and into the existing aperture of the conventional deadbolt.

The lower portion of the modular unit 12 includes a mounting bracket 20 having a central aperture 22 and outer side apertures 24. The central aperture 22 is used for receiving the conventional turn shaft of the conventional doorknob and the outer apertures 24 are used for securing the lower portion of the modular unit to the lock. The outer apertures are alignable with the existing apertures of a conventional knob of a conventional door. For securement, threaded screws or the like are inserted into each side aperture 22 and extend into the aligned and existing apertures of the conventional doorknob lock assembly. Thereby, providing for the lower portion of the modular unit to be secured to the knob lock itself and not the door. This arrangement prevents marring and marking the conventional door. Optionally, the bracket may include additional apertures that are disposed for securing the unit 12 to a conventional door assembly. This will provide for a plurality of apertures (four in all) that are symmetrically disposed with respect to the central aperture. This is done so as to allow for any type of lock to be secured to the conventional door assembly. Generally, the holes are located either vertically and linearly or horizontally and linearly. The use of two sets of apertures will allow for either type of configuration (vertical and linear or horizontal and linear).

Corresponding to the apertures extending through the bracket secured to the lower portion of the modular unit are apertures extending through the lower portion of the modular unit 12. These apertures correspond to the central aperture and side apertures, respectively. Hence, when attaching the unit 12 to the conventional doorknob lock, the screws are inserted into the apertures of the modular unit 12, through the apertures of the bracket and into the existing aperture of the conventional doorknob.

It is noted that the mounting brackets 14 and 20, respectively, used in the modular unit 12 can be eliminated. The upper portion of the modular unit 12 may include channels that are shaped and configured substantially the same as the channels located in the bracket. The apertures in the lower portion of the modular unit 12 would remain the same.

To protect the door further, the back surface of the modular unit 12 may include spacers. These spacers will prevent the modular unit 12 from contacting the door. This will further protect the door from damage and possible marring.

A first gear assembly is used for controlling the rotation of the locking shaft of the conventional deadbolt. Thereby providing for the gear assembly to rotate in a first direction for unlocking the deadbolt, and rotating in an opposite direction for unlocking the deadbolt. The gear assembly as illustrated in FIGS. 3–6 comprises a first conventional motor 24*a* that is mounted to the upper modular unit 12. To aid in securing the motor to the modular unit 12, the motor is encased in housing 28*a*. Extending outwardly from the housing are flanges 30*a*. Extending through the flanges are orifices (illustrated, but not labeled) for securing the motor to the modular unit 12. Internally threaded rods 32*a* (see FIG. 4) extend upwardly from the upper modular unit 12. For securing the motor to the modular unit, the orifices are aligned with the internally threaded rods 32*a*; screws or the like are inserted therethrough for securement.

The motor 24*a* is conventional and includes a shaft. The shaft includes an outer end that is shaped as an auger 26*a* (see FIG. 10). The auger 26*a* contacts and engages a first rotating gear 28 that is fixed to the modular unit 12. The rotating gear 28 is secured to the modular unit 12 via a shaft 34*a*. Thus, the shaft extends centrally through the gear to provide for the gear to be secured to the modular unit 12, while enabling the gear to rotate freely about the fixed shaft.

The first rotating gear 28 is coupled to a gear shaft 30 in order to provide for locating the rotating gear 28 under the gear shaft 30. Contacting and engaging the gear shaft 30 is a second gear or linking gear 32. This linking gear is secured to the modular unit 12 via an axle 34*b*, thus providing for the second gear to be secured to the modular unit 12 and rendering a gear that can rotate freely about the shaft. Secured to the linking gear 32 is a second gear shaft 36 (illustrated in outline in FIG. 3). The second gear shaft is coupled to a control gear 38.

The control gear 38 is centrally located around the conventional axle of the deadbolt unit, via the central opening illustrated, but not labeled, but is not coupled to the conventional axle of the deadbolt unit. Rather, the gear is secured to the modular unit so as to be centrally located with respect to the deadbolt assembly. As seen in the drawings, outward flanges from the central aperture secure the gear to the modular unit 12. Thereby providing for the control gear 38 to be fixed to modular unit 12, yet still be free to rotate above the central point of the conventional locking mechanism. The control gear further includes a channel 40*a*. The channel 40*a* receives an adapter or finger that is coupled to the rotating lock mechanism of the conventional deadbolt. Upon rotation of the control gear, the channel moves the adapter or finger, which will consequently force the lock mechanism to turn in a desired direction. This arrangement is illustrated in further detail in FIG. 12 and discussed hereinbelow.

The control gear 38 controls the direction of rotation by having a plurality of cams 42*a* and 42*b* located thereon. Each cam represents a lock or unlock status. Thus, a lock cam is located on one side (42*a* or 42*b*, depending upon the type and style of deadbolt being utilized), while an unlock cam (42*a* or 42*b*, depending upon the type and style of deadbolt being utilized) is located on the opposite side of the control gear. A micro-switch 44*a* is located in proximity to the control gear and is in engageable contact with each cam. Accordingly, in operation rotation of the gear will cease upon the contact between the particular cam and the micro-switch. For example, if the deadbolt is in an unlock position and the user wants to lock the unit, the motor will run and continue to run until the micro-switch engages the lock cam. Once contact is made, the control gear ceases rotation. It is noted that a second micro-switch 44*b* can be provided for accommodating various styles of locks and rotation pattern.

Extending through the control gear 38 is a pair of apertures 46. These apertures are aligned with the apertures that extend through the modular unit 12 and the channels that extend through the mounting bracket 14.

For controlling rotation of the locking mechanism of the conventional doorknob, a doorknob gear assembly is utilized. Thus providing for the gear assembly to rotate in a first direction for unlocking the deadbolt, and rotating in an opposite direction for unlocking the deadbolt. The door knob gear assembly as seen in FIGS. 3, 5, 7–9 and comprises a second conventional motor 26*b* that is mounted to the lower modular unit 12, in a similar fashion and configuration as the motor of the first gear assembly described hereinabove. Accordingly, to aid in securing the second motor 26*b* to the modular unit, the motor is encased in a second housing 28*b*. Extending outwardly from the housing are flanges 30*b*; and, extending through the flanges are orifices (illustrated, but not labeled). Internally threaded rods 32*b* extend upwardly from the upper modular unit 12. For securing the motor to the modular unit, the orifices are aligned with the internally threaded rods 32*b*; and screws or the like are inserted therethrough.

In the second gear assembly, an auger is secured to the axle of the second conventional motor 26*b*. This auger is in communication with a first gear 48. The first rotating gear 48 is affixed to the modular unit via an axle 50. Thus, the axle extends centrally through the gear 48 to provide for the fixed status, yet allowing the gear 48 to rotate freely about the axle 50. As seen, to stabilize the second motor 26*b*, a flange portion of the housing of the second motor extends over and is secured to the axle. As seen, the flange portion will not contact any portion of the gear assembly, thus allow the gears to rotate freely and without obstruction.

The first gear 48 includes a gear shaft 50 which will provide for the gear shaft to be located above the first gear. The gear shaft 50 is coupled to the main gear or control gear 52.

The control gear 52 is centrally located around the conventional axle of the doorknob unit via the central opening illustrated, but not labeled, and is not coupled to the conventional axle of the doorknob unit. Rather, the gear is secured so as to be centrally located wwith respect to the doorknob assembly. As seen in the drawings, outward flanges from the central aperture secure the control gear 52 to the modular unit. Thereby providing for the control gear to be secured to the modular unit 12, yet still be free to rotate above the central point of the conventional locking mechanism, by providing rotation about the outward flanges. The control gear 52 further includes a first channel 54*a* and a second channel 54*b*. An adapter or finger extends into the first channel or second channel. The location of the finger into the appropriate channel is dependent upon the type and style of lock current installed on the door, such as locks made by SCHLAGE, TITAN and KWIKSET.

The channels 54*a* and 54*b* receive the adapter or finger that is coupled to the rotating lock mechanism of the conventional doorknob. Upon rotation of the control gear, the channel forces the adapter or finger to rotate. Upon rotation of the adapter, the lock mechanism will inherently turn in the desired direction. The adapter is illustrated and discussed in further detail hereinbelow with reference to FIG. 11.

Grooves 56 are also located within the control gear 52 and are located in proximity to the channels 54*a* and 54*b*. The grooves 56 are for exposing the plurality of apertures that extend through the module unit 12 and second mounting bracket 20. The grooves will enable the second support brace to be secured to the conventional doorknob lock assembly and yet provide for the screws inserted therein to be located under the gear, so as to be non-obtrusive. During activation, the motor 24*b* will cause the gear shaft 26*b* to rotate. The rotation of the gear shaft 26*b* will provide for the first rotating gear 48 to rotate. The rotation of the first rotating gear 48 causes the gear shaft to revolve, intrinsically causing the linking/activation gear 32 to rotate. Rotation of the control gear 52 will commence once the linking gear 32 rotates. Rotation ceases via use of micro switches as described hereinabove.

As seen in the figures, the direction of rotation of the control gear 52 is controlled by two sets of cams 58*a* and 58*b*, located thereon. Each set of cams represents a lock or unlock status, depending upon which channel is utilized. Thus, a lock cam from one set is located on one side (depending on the type and style of doorknob lock device being utilized) while an unlock cam (depending on the type and style of doorknob lock being utilized) is located on the opposite side of the control gear. A micro-switch 60*a* and 60*b* is located in proximity to the control gear and is in engageable contact with each set of cams 58*a* and 58*b*. Accordingly, in operation, rotation of the control gear 52 will cease upon the contact between the particular cam of a particular set and the particular micro-switch. For example, if the doorknob lock device is in an unlock position and the user wants to lock the unit, the motor will run and continue to run until the micro-switch engages the lock cam. Once contact is made, the control gear 52 ceases rotation.

It is noted that the gear assembly that is coupled to the doorknob lock device controls the lock assembly and not the doorknob itself. Thus the gear assembly operates separately and independently from the doorknob system.

In the first and second assemblies, gear shafts are used as a way of saving space. This will provide for gears to overlap each other while avoiding contact therebetween. Thus, the use of gear shaft enhances the final product by enabling the product to be reduced in overall size and shape so as to provide for a non-obtrusive assembly.

Adapters or fingers are used to enable the locking mechanism of the conventional door locks to turn and rotate. These adapters are coupled to the control gear of each gear assembly and to the locking mechanism of each conventional door lock.

FIG. 11 illustrates the adapter used with the conventional deadbolt lock of the present invention. As shown, the adapter 62*a* is a hollow tubular structure having a first end 74, a second end 76, and a center portion 68. Extending through the adapter 62*a* is a center core 70 that is substantially the same shape as the conventional locking shaft (mechanism) of a conventional deadbolt. An L-shaped member or finger 72 extends outwardly and downwardly from the center portion 68 of the adapter 62*a*. This L-shaped member or finger 72 is received within the channel of the control gear 38. The first end 74 of the adapter 62*a* will receive the conventional lock shaft of the conventional deadbolt lock. The second end 76 will receive the interior door components (turn knob mechanism). This arrangement will provide for the adapter 62*a* to be sandwiched between and coupled to the lock mechanism and the interior hardware of the conventional deadbolt.

The doorknob adapter 62*b* is illustrated in FIG. 12 and includes two elements, an interior portion 78*a* and an exterior portion 78*b*. It is noted that the interior portion and the exterior portion can be coupled to each other for forming a singular and integral structure. The interior portion 78*a* is used for coupling the lock mechanism to the interior hardware of the conventional doorknob. The exterior portion 78*b* is designed so as to prevent the knob from turning, when activating the present invention, so as to solely render rotation of the lock mechanism.

As such, the interior portion 78*a* is an elongated member having a first end 80 and a second end 82. The second end is a solid shaft for receiving the core of the conventional doorknob lock assembly. The first end 80 is hollow and receives the lock mechanism of the conventional doorknob. Located between the first end and the second end is a "h" shaped member or finger 72, which will be received within the particular channel of the control gear for the doorknob lock assembly.

The exterior portion 78*b* includes a hollow tubular member 84 having a central core 86. The core 86 will receive the interior portion 78*a*. Extending outwardly from the interior area of the central core 86 is a C-shaped flange 88. Extending outwardly from the opposite side of tubular member 84, exteriorly from the core, is a second C-shaped flange, illustrated, but not labeled, which is substantially shorter in length than the first flange member.

When the interior portion 78*a* is located within the core 86, the finger 72 will extend outwardly from the second C-shaped flange 90. The first C-shaped flange is used as a stop, and is located opposite from the turning mechanism of the conventional doorknob. This first C-shaped flange 88 will prevent the knob mechanism from turning, yet, the interior portion 78*a* will still be free to rotate within the center core 86 of the exterior portion 78*a*.

It is noted that the interior portion can be eliminated dependent upon the lock being utilized.

Centrally located on the module unit 12 is a removable housing 92. This housing is designed and configured to house and maintain batteries for powering the electrical components of the present invention. A control unit 94 is located above the housing and is non-removable. The control unit 94 comprises a circuit board that houses the electrical components and circuitry for adequately operating the present invention.

A remote control unit RC is used to send a signal to the receiver R. Once a signal is received, the receiver will cause the control unit to activate the motors simultaneously. Optionally, the remote control unit RC and control unit may include options for controlling which lock to operate. Activation of the control unit will cause the locks to unlock or lock, as desired by the user.

Figure 14:
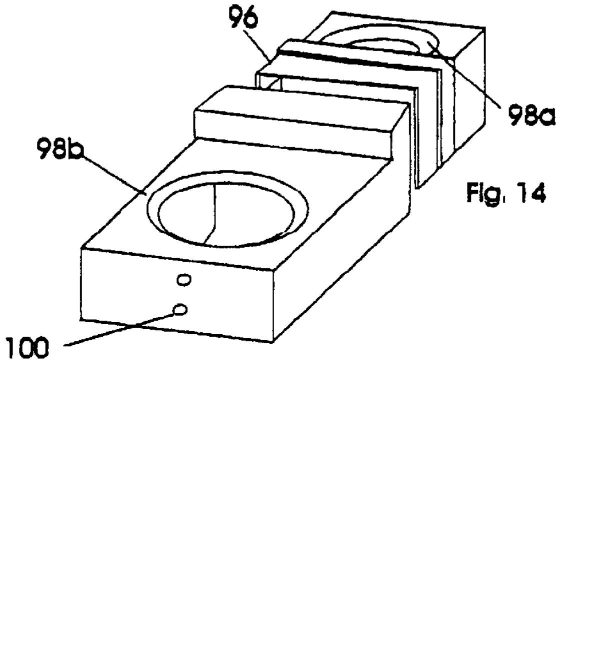
FIG. 14 is a perspective view of the cover used with the present invention.
Figure 13:
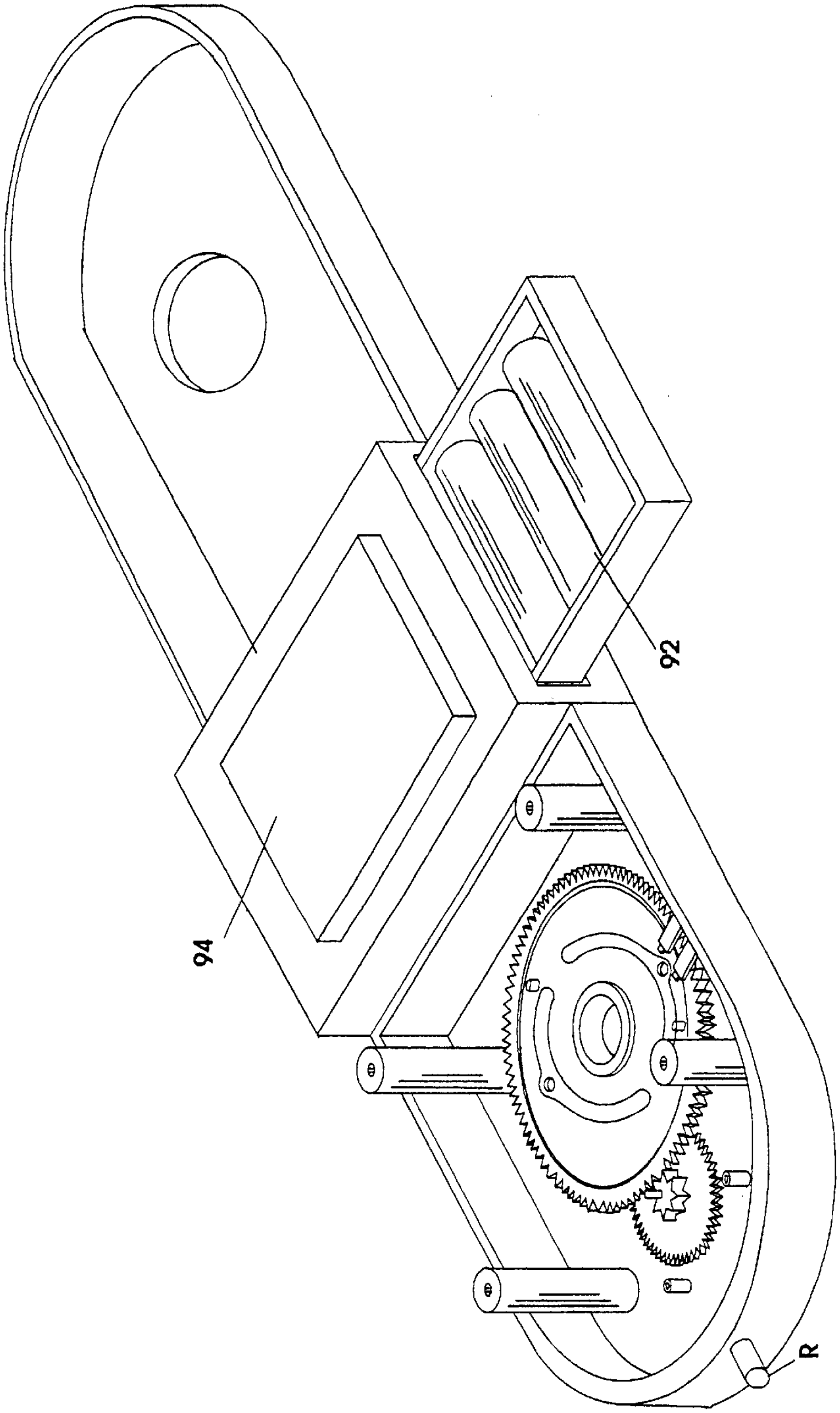
FIG. 13 is a perspective view of the cover illustrating the housing used for maintaining the power source.
Figure 15:
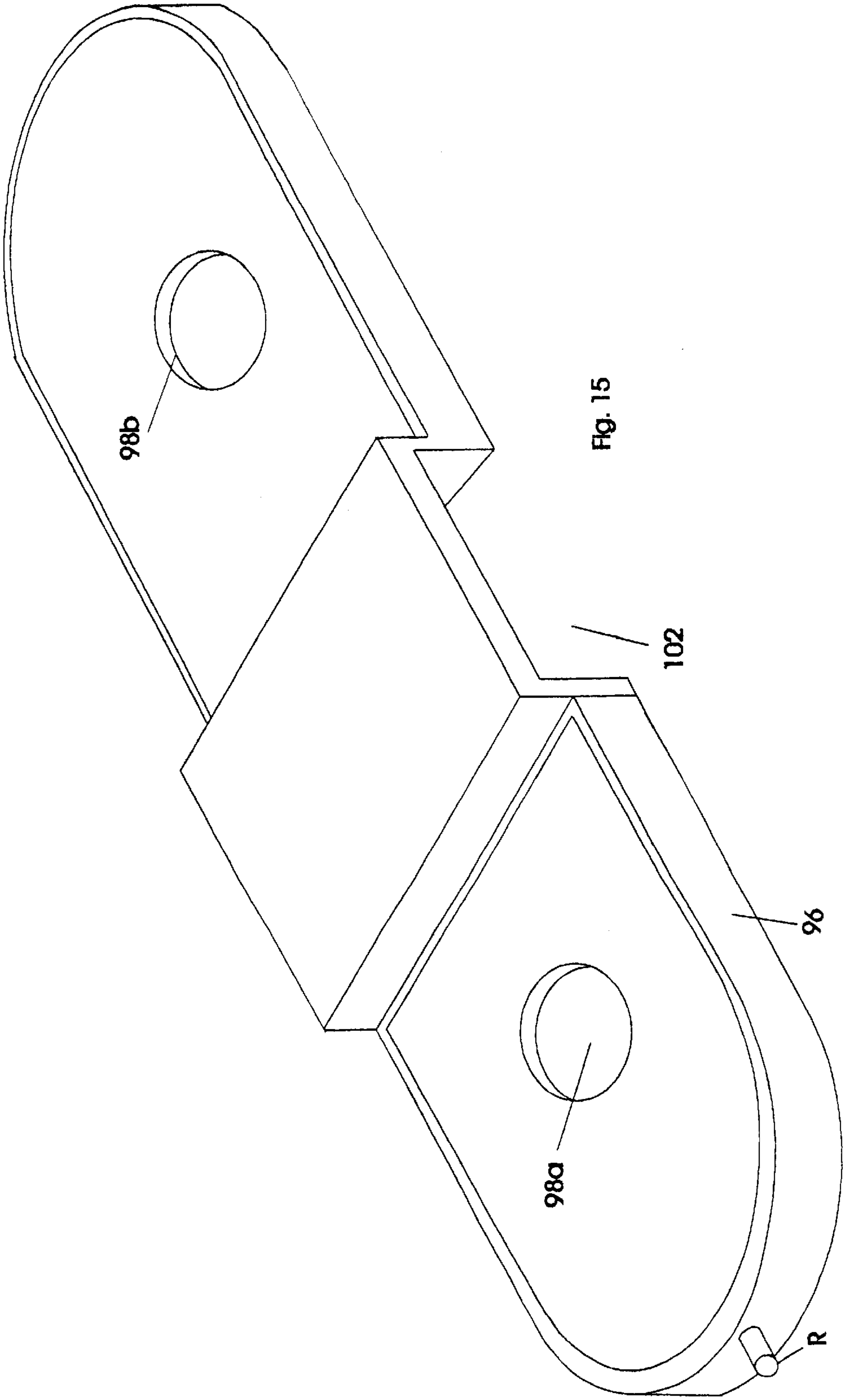
FIG. 15 is a perspective view of the cover used with the present invention.
Figure 16:
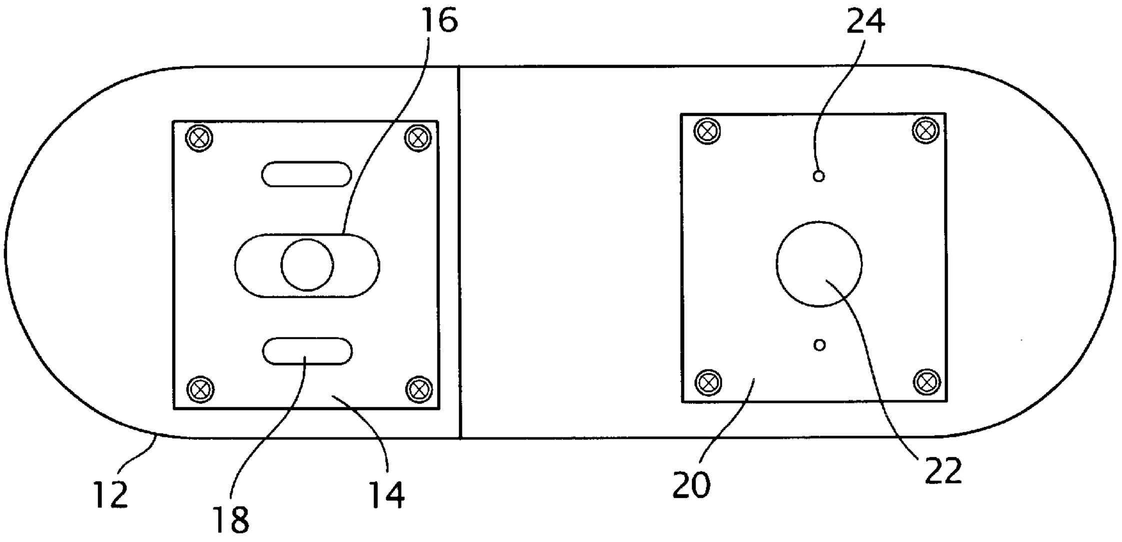
FIG. 16 is a perspective view of the brackets secured to the modular of the present invention.

For protection the components, a cover C, as seen in FIGS. 14–15, is provided and is placed over the side walls of the modular unit 12. The cover is slidably and securely mounted to the modular unit once it is assembled. This cover will protect and conceal the components of the assembly to provide for an aesthetically pleasing product. As seen, the cover includes an upper section 96 and a lower section. The upper section includes an opening 98*a* for receiving the interior elements of the conventional deadbolt assembly. Though not illustrated, a brace or the like can extend across the opening for providing a means of securing the interior components of the deadbolt to the cover or housing C. This brace would be integral with the housing and will include threaded apertures for threadably securing the conventional element to the cover.

The lower portion includes an additional opening 98*b* for receiving the interior elements of the conventional doorknob assembly. Though not illustrated, a brace or the like may extend across the opening for providing a means of securing the interior components of the doorknob to the cover or housing C. This brace would be integral with the housing and includes threaded apertures for threadably securing the conventional element to the cover.

Since the first portion is slideably secured to the second portion, an inherent adjusting length is provided. This inherent adjusting length allows the user to attach the cover regardless of the distance between the deadbolt and doorknob.

Located at the lower end of the cover is openings 100 for receiving and maintaining the receiver R. The cover further includes a groove 102 for slideably receiving the housing that maintains the batteries.

The system of the present invention as defined in FIGS. 1–16 can be installed as a kit or can be retrofitted onto an existing door lock system as desired.

The unique design and configuration of the system of the present invention provides for a system that enables the unit to work via a remote control unit as well as be manually workable. In addition, the structure of the device when used with a doorknob provides a system that operates independently from the doorknob. All that rotates is the locking mechanism. This rotation occurs by way of the motor as described above.

While the invention has been particularly shown and described with reference to an embodiment thereof, it will be understood by those skilled in the art that various changes in form and detail may be made without departing from the spirit and scope of the invention.

I claim:

1. A locking system to be used in combination with a conventional lock device having a deadbolt system and a doorknob system, said locking system comprising:

a first gear assembly coupled to a first type lock mechanism in a conventional lock device;

a second gear assembly coupled to a second type lock mechanism in a conventional lock device;

a receiver coupled to a control unit;

a remote control device;

a transmitter located within said remote control device;

a control unit for controling said first gear assembly and said second gear assembly for enabling said first type lock mechanism to lock or unlock and said second type lock mechanism to lock or unlock; and said transmitter sending a signal to said receiver for activating said control.

2. A remote control locking system for use in combination with a first and a second lock mechanism in a conventional door locking device, said locking system comprising:

a. a first gear assembly coupled to said first lock mechanism;

b. a second gear assembly coupled to said second lock mechanism;

c. a receiver coupled to a control unit disposed for controlling said first and said second gear assemblies for enabling said first lock mechanism to lock or unlock; and, d. a remote control device including a transmitter for sending a signal to said receiver for activating said locking system.

3. The remote control locking system as in claim 2 further including a first motor driving said first gear assembly and operative in response to a first signal from said receiver.

4. The remote control locking system as in claim 2 further including a second motor driving said second gear assembly and operative in response to a second signal from said receiver.

5. The remote control locking system as in claim 2 wherein said first and second gear assemblies and said receiver are secured to a base and said base, said gear assemblies and said receiver constitute a modular unit, further including a mounting bracket coupled between said conventional lock device and said base, said modular unit being coupled to said lock device in order to provide for said modular unit to be coupled to said lock device and for preventing marring or damage to occur to an existing door which houses said lock device.

6. The remote control locking system as in claim 5 wherein said modular unit is adjustable in length to compensate for various distances which may occur between said deadbolt system and said door lock system.

7. The remote control locking system as in claim 2 wherein a first adapter is secured to said first gear assembly and said deadbolt system, a second adapter is secured to said second gear assembly and said doorknob system, whereby rotation of said first gear assembly forces rotation of said first adapter thereby forcing said deadbolt system to rotate, and rotation of said second gear assembly forces rotation of said second adapter thereby forcing said doorknob system to rotate.

8. The remote control locking system as in claim 2 further including a first motor driving said first gear assembly and operative in response to a first signal from said receiver, a first contact switch electrically coupled to said first motor and disposed in proximity to said first gear assembly for engaging with and operatable by a first cam assembly in order to cease operation of said first motor and rotation of said first gear assembly when in a locked or unlocked position.

9. The remote control locking system as in claim 2 further including a second motor driving said second gear assembly and operative in response to a second signal from said receiver, a second contact switch electrically coupled to said second motor and disposed in proximity to said second gear assembly for engaging with and operatable by a second cam assembly in order to cease operation of said second motor and rotation of said second gear assembly when in a locked or unlocked position.

10. A remote control locking system for use in combination with a deadbolt lock and a doorknob locking mechanism in a conventional door locking device, said locking system comprising:

a. a first gear assembly coupled to said deadbolt lock mechanism;

b. a second gear assembly coupled to said doorknob lock mechanism;

c. a receiver coupled to a control unit disposed for controlling said first gear assembly and said second gear assembly for enabling said deadbolt lock mechanism to lock or unlock and said doorknob lock mechanism to lock or unlock;

d. a remote control device including a transmitter for sending signals to said receiver for activating said locking system;

e. a first motor driving said first gear assembly and operative in response to a first signal from said receiver; and, f. a second motor driving said second gear assembly and operative in response to a second signal from said receiver.

11. The remote control locking system as in claim 10 further including a first contact switch electrically coupled to said first motor and disposed in proximity to said first gear assembly for engaging with and operable by a first cam assembly in order to cease operation of said first motor and rotation of said first gear assembly when in a locked or unlocked position.

12. The remote control locking system as in claim 10 further including a second contact switch electrically coupled to said second motor and disposed in proximity to said second gear assembly for engaging with and operable by a second cam assembly in order to cease operation of said second motor and rotation of said second gear assembly when in a locked or unlocked position.

13. The remote control locking system as in claim 10 further including a first adapter secured to said first gear assembly and said deadbolt system, a second adapter secured to said second gear assembly and said doorknob system, wherein rotation of said first gear assembly forces rotation of said first adapter thereby forcing said deadbolt system to rotate, and rotation of said second gear assembly forces rotation of said second adapter thereby forcing said doorknob system to rotate.

14. The remote control locking system as in claim 10 wherein said first and second gear assemblies and said receiver are secured to a base and said base, said gear assemblies and said receiver constitute a modular unit, further including a mounting bracket coupled between said conventional lock device and said base, said modular unit being coupled to said lock device in order to provide for said modular unit to be coupled to said lock device and for preventing marring or damage to occur to an existing door which houses said lock device.

15. The remote control locking system as in claim 14 wherein said modurlar unit is adjustable in length to compensate for various distances which may occur between said deadbolt system and said door lock system.

* * * * *